United States Patent [19]

Kroeger et al.

[11] Patent Number: 5,523,726
[45] Date of Patent: Jun. 4, 1996

[54] DIGITAL QUADRIPHASE-SHIFT KEYING MODULATOR

[75] Inventors: Brian W. Kroeger, Sykesville; Roy Stehlik, Columbia, both of Md.

[73] Assignee: Westinghouse Electric Corporation, Pittsburgh, Pa.

[21] Appl. No.: 322,833

[22] Filed: Oct. 13, 1994

[51] Int. Cl.$^6$ ............................. H03C 3/00; H04L 27/18; H04L 27/20

[52] U.S. Cl. ......................... 332/103; 332/104; 375/279; 375/281; 375/308

[58] Field of Search ...................................... 332/103–105; 375/279–284, 308

[56] References Cited

U.S. PATENT DOCUMENTS

| | | | |
|---|---|---|---|
| 4,143,322 | 3/1979 | Shimamura | 325/320 |
| 4,318,049 | 3/1982 | Mogenson | 329/50 |
| 4,466,108 | 8/1984 | Rhodes | 375/83 |
| 4,787,096 | 11/1988 | Wong | 375/120 |
| 4,879,728 | 11/1989 | Tarallo | 375/80 |
| 5,285,479 | 2/1994 | Iwane | 332/103 X |

OTHER PUBLICATIONS

Connelly, "Design of the Westinghouse Series 1000 Mobile Phone," IEEE, pp. 347–350, May 18, 1993.
Connelly, "The Westinghouse Series 1000 Mobile Phone: Technology and Applications," IEEE, pp. 375–379, May 18, 1993.

*Primary Examiner*—David Mis
*Attorney, Agent, or Firm*—C. O. Edwards

[57] ABSTRACT

A digital quadriphase-shift keying modulator is described which generates a modulated intermediate carrier frequency (IF) based on a desired number of samples for each input information bit. The design includes a ROM (or RAM) look-up table which stores digitized waveforms. The inphase and quadrature components of a complex baseband signal are translated to an IF at a multiple of the sampling rate simply by alternating the inphase and quadrature samples and alternating signs. The real IF output is produced by summing the inphase and quadrature signals.

30 Claims, 5 Drawing Sheets

DIGITAL QUADRIPHASE-SHIFT KEYING MODULATOR

RELATED APPLICATIONS

U.S. patent application entitled "Mobile Terminal Apparatus and Method For A Satellite Communication System" filed by Albert J. Fasulo II, Denise M. Cammarata, Keith W. Janson, Samuel S. Anderson, Raymond R. Cooper, and Roy Stehlik, on the same date as the instant application which is a continuation-in-part of U.S. patent application Ser. No. 08/242,400 filed May 13, 1994, is incorporated by reference.

U.S. patent application entitled "Carrier Acquisition Technique For Mobile Radio QPSK Demodulator" filed by Brian W. Kroeger, Joseph B. Bronder, and Jeffrey S. Baird on the same date as the instant application is incorporated by reference.

U.S. patent application entitled "Locally Coherent QPSK Detection With Differential Decoding For A Fading Channel" filed by Brian W. Kroeger, Joseph B. Bronder, and Jeffrey S. Baird, on the same date as the instant application is incorporated by reference.

U.S. patent application entitled "Numerically Controlled Oscillator With Complex Exponential Outputs Using Recursion Technique" filed by Brian W. Kroeger and Jeffrey S. Baird on the same date as the instant application, is incorporated by reference.

U.S. patent application entitled "Carrier Tracking Loop For QPSK Demodulator" filed by Brian W. Kroeger, Jeffrey S. Baird, and Joseph B. Bronder on the same date as the instant application, is incorporated by reference.

U.S. patent application entitled "Symbol Synchronizer Using Modified Early/Punctual/Late Gate Technique" filed by Brian W. Kroeger, Joseph B. Bronder, Tod A. Oblak, and Jeffrey S. Baird, on the same date as the instant application, is incorporated by reference.

BACKGROUND OF THE INVENTION

1. Field of the Invention

The present invention relates to modulating signals to be transmitted in communication systems. Although useful for many types of communication systems, the present invention, a quadriphase-shift keying modulator, is particularly useful for a satellite communication system and is described in that connection.

2. Description of Related Art

In a typical satellite communication system, outgoing RF (radio frequency) signals transmitted from a mobile terminal unit are received directly by the satellite. The satellite in turn retransmits the RF signals to a ground station that is connected by wire to a public switched telephone network (PSTN), which in turn routes the outgoing signals to either a conventional telephone or to another mobile terminal unit of a satellite or cellular network. Incoming signals from a conventional wired telephone are conducted from the PSTN to the satellite ground station, which in turn transmits RF signals to the satellite for retransmission to the mobile terminal unit. Thus, communication can occur between two mobile terminal units or between a mobile terminal unit and a conventional telephone connected to a PSTN, or between a satellite mobile terminal unit and a cellular mobile terminal unit, for example. In each of the aforesaid conditions, the communication is routed through a PSTN.

It has been proposed to provide a satellite communications network that utilizes high altitude geosynchronous satellites each of which is capable of covering an area corresponding to a substantial portion of the North American continent, so that a single satellite with approximately six beams will cover the entire continent from Alaska to Mexico. The satellite for such a network will be approximately 22,600 miles above the equator and will be designed to operate in the L-Band of RF frequencies. For example, the frequency of the signal being transmitted to the satellite will be between 1626 MHz to 1660 MHz; and the frequency of the signal received from the satellite will be between 1525 MHz to 1559 MHz.

In such a satellite communications network, the information is processed in digital form prior to transmission, and the digital information is modulated onto a carrier frequency before being transmitted.

Common forms of modulation include frequency modulation, amplitude modulation, and phase modulation.

In typical forms of phase modulation, pairs of digital bits comprising symbols which represent four different possibilities of data to be modulated onto the carrier wave are input to an analog baseband waveform generator. The baseband waveform generator produces an inphase waveform and a quadrature waveform. These two waveforms are then used to drive a single sideband modulator, or complex up-converter, to produce an Intermediate Frequency (IF) or RF waveform.

The typical direct up-converters and modulators require dual digital-to-analog (D/A) converters for the inphase and quadrature components. The D/A converters introduce imbalances between the inphase and quadrature components due to manufacturing tolerances and temperature differences in the D/A converter components and imprecise gains in the subsequent amplifiers. Furthermore, the typical digital system does not lend itself to efficient implementation.

In light of the foregoing, there is a need for a terminal unit that is not only capable of reliably modulating digital signals onto a carrier frequency for voice, facsimile, and data communication, but which is also compact, lightweight, and relatively inexpensive to manufacture.

SUMMARY OF THE INVENTION

One advantage of this invention is a digital quadriphase-shift keying (QPSK) modulator amenable to discrete digital implementation using inexpensive, off-the-shelf components.

Additional advantages and features of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the features and advantages and in accordance with the purpose of the invention, as embodied and broadly described herein, there is provided a method in a mobile terminal unit of modulating binary data sequences, each having a plurality of symbols occurring at a symbol frequency, to an intermediate carrier frequency, and a ROM having a plurality of stored digital waveforms including a plurality of digitized samples and corresponding to one of a plurality of outputs of a filter in response to a plurality of combinations of symbol inputs having a predetermined span of symbols, said method comprising the steps of: inputting, in parallel, first and second data sequences at the symbol frequency; multiplexing an M number of symbols from each sequence at a sample frequency, the sample frequency being the intermediate carrier frequency divided by four to produce a multiplexed train of successive groups of the M number of symbols, in parallel, from first and second data sequences; inverting every other pair of successive groups of the multiplexed train to form successive first portions of an address from successive inverted and non-inverted groups of the multiplexed train; forming successive second portions of the address in accordance with a position of one of the groups in the inverted and non-inverted groups of the multiplexed train; outputting from the ROM contents of a storage location corresponding a combination of the first and second portions of the address, so that for each parallel input from the first and second data sequences, a number of digital samples, corresponding to the sample frequency, are read out from the ROM at the intermediate carrier frequency; and converting the ROM outputs to an analog signal at the intermediate carrier frequency.

In another aspect, the invention includes a digital modulator for modulating to a cancer frequency data sequences, each having a plurality of symbols occurring at a symbol frequency, and a ROM having a plurality of stored digital waveforms including a plurality of digitized samples and corresponding to one of a plurality of outputs of a filter in response to a plurality of combinations of symbol inputs having a predetermined span of symbols, said digital modulator comprising: serial to parallel input means for serially inputting, in parallel, first and second data sequences at the symbol frequency and outputting, in parallel, an M number of symbols from both trains; a multiplexer for multiplexing the M number of symbols from each data sequence at a sample frequency, the sample frequency being an intermediate carrier frequency divided by four to produce a multiplexed train of successive groups of the M number of symbols, in parallel, from first and second data sequences; an inverter for inverting every other pair of successive groups of the multiplexed train to form successive first portions of an address from successive inverted and non-inverted groups of the multiplexed train; counting means for determining a position of one of the groups in the inverted and non-inverted groups of the multiplexed train corresponding to the first portion of the address; address forming means forming successive second portions of the address from the position of the one of the groups in the inverted and non-inverted groups of the multiplexed train corresponding to the first portion of the address; a ROM for outputting contents of a storage location corresponding to a combination of the first and second portions of the address, so that for each parallel input from the first and second data sequences, a number of digital samples, corresponding to the sample frequency, are read out from the ROM at the intermediate carrier frequency; a digital-to-analog converter for converting the ROM outputs to an analog signal at the intermediate carrier frequency; and an up-converter for converting the analog signal to a carrier frequency.

It is to be understood that both the foregoing general description and the following detailed description are exemplary and explanatory only and are not restrictive of the invention, as claimed.

The accompanying drawings, which are incorporated in and constitute a part of this specification illustrate an embodiment of the invention and, together with the description, serve to explain the objects, advantages and principles of the invention.

BRIEF DESCRIPTION OF THE DRAWINGS

FIGS. 4 (a) to 4 (e) are diagrams of waveforms used to illustrate the operation of the present invention.

DESCRIPTION OF THE PREFERRED EMBODIMENT

Reference will now be made in detail to the present preferred embodiment of the invention, an example of which is illustrated in the accompanying drawings.

Figure 1:
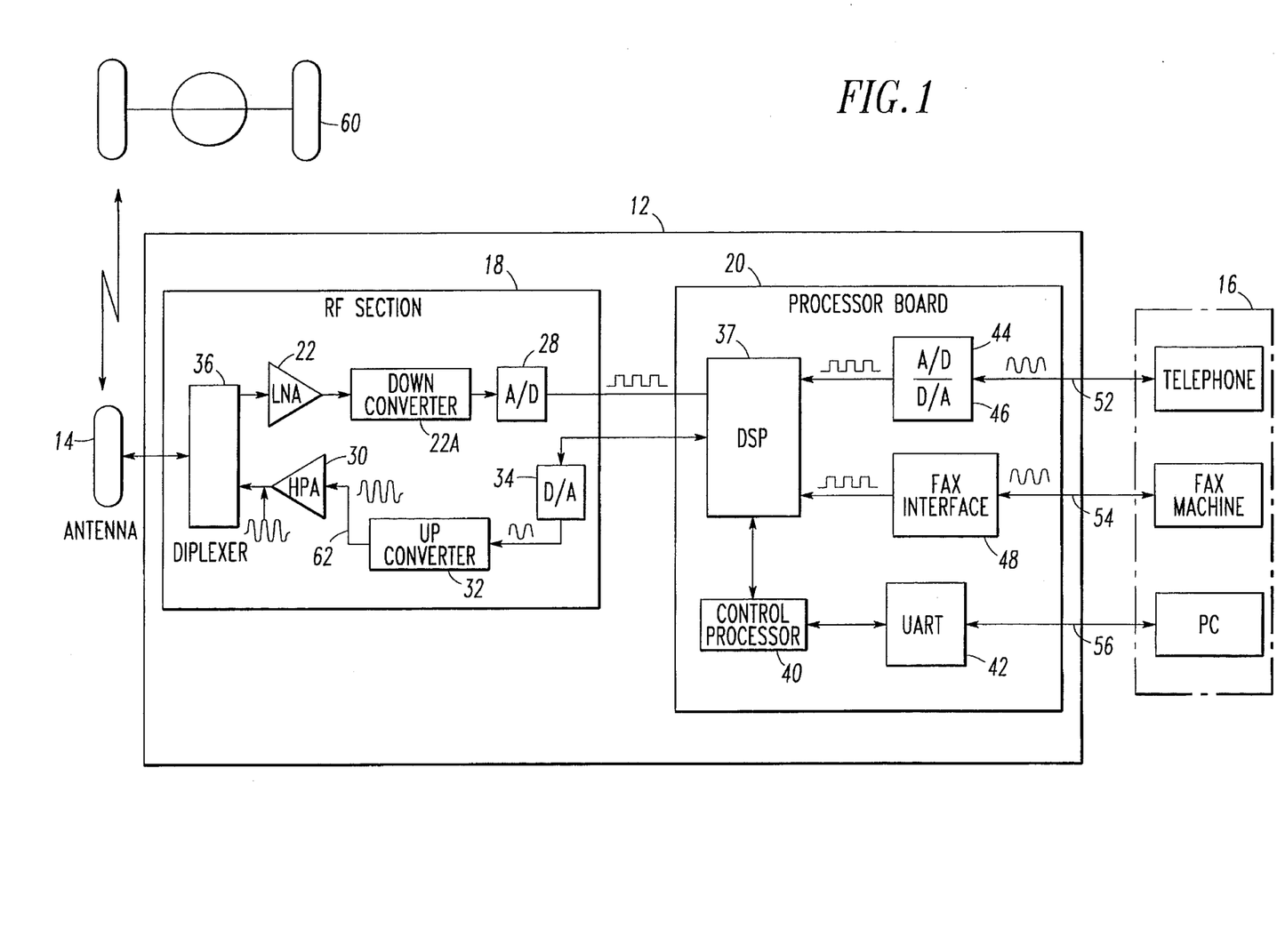
FIG. 1 is a schematic block diagram of a mobile terminal apparatus in accordance with the present invention.

The mobile terminal unit (MT) of the present invention comprises a transceiver 12, an antenna 14, and one or more user interfaces 16. The transceiver 12 has an RF section 18 and a processor board 20.

The RF section has a receiving portion that includes a low noise amplifier (LNA) 22, a down converter 22a, and an analog-to-digital converter (A/D) 28. The RF section 18 also has a transmitter portion that includes a high power amplifier (HPA) 30, an up converter 32, signal line 62, digital-to-analog converter (D/A) 34. The antenna 14 is connected to the RF section through diplexer 36.

The processor board of the present invention has a digital signal processor, a control processor, a universal asynchronous receiver/transmitter (UART), and a plurality of analog-to-digital converters (A/D) and digital-to-analog converters (D/A). As herein embodied processor board 20 has a digital signal processor (DSP) 37, a control processor 40, a universal asynchronous receiver transmitter (UART) 42, an A/D 44, a D/A 46, a FAX interface 48, and a D/A 50. The user interfaces of the terminal unit of the present invention include an output 52 for a handset, an output 54 for a facsimile machine, and an output 56 for connection to a personal computer (PC).

The transmit signal begins in the processor board as digital data, which is then converted into digitized, modulated waveform samples per the invention. This digitized waveform, which is created by the processor 37 is conducted to the D/A before the up-converter 32 of the RF section. The analog waveform is then sent to the up-converter where it is up-converted to an RF carrier frequency, and then summed to form a low level RF carrier frequency transmit signal on line 62. This low level RF carrier frequency transmit signal is amplified by the high power amplifier 30. The resulting high level RF frequency carrier transmit signal then passes through a transmit side of the diplexer 36 and is steered towards the MT antenna 14 from which it travels to a satellite 60.

Figure 2:
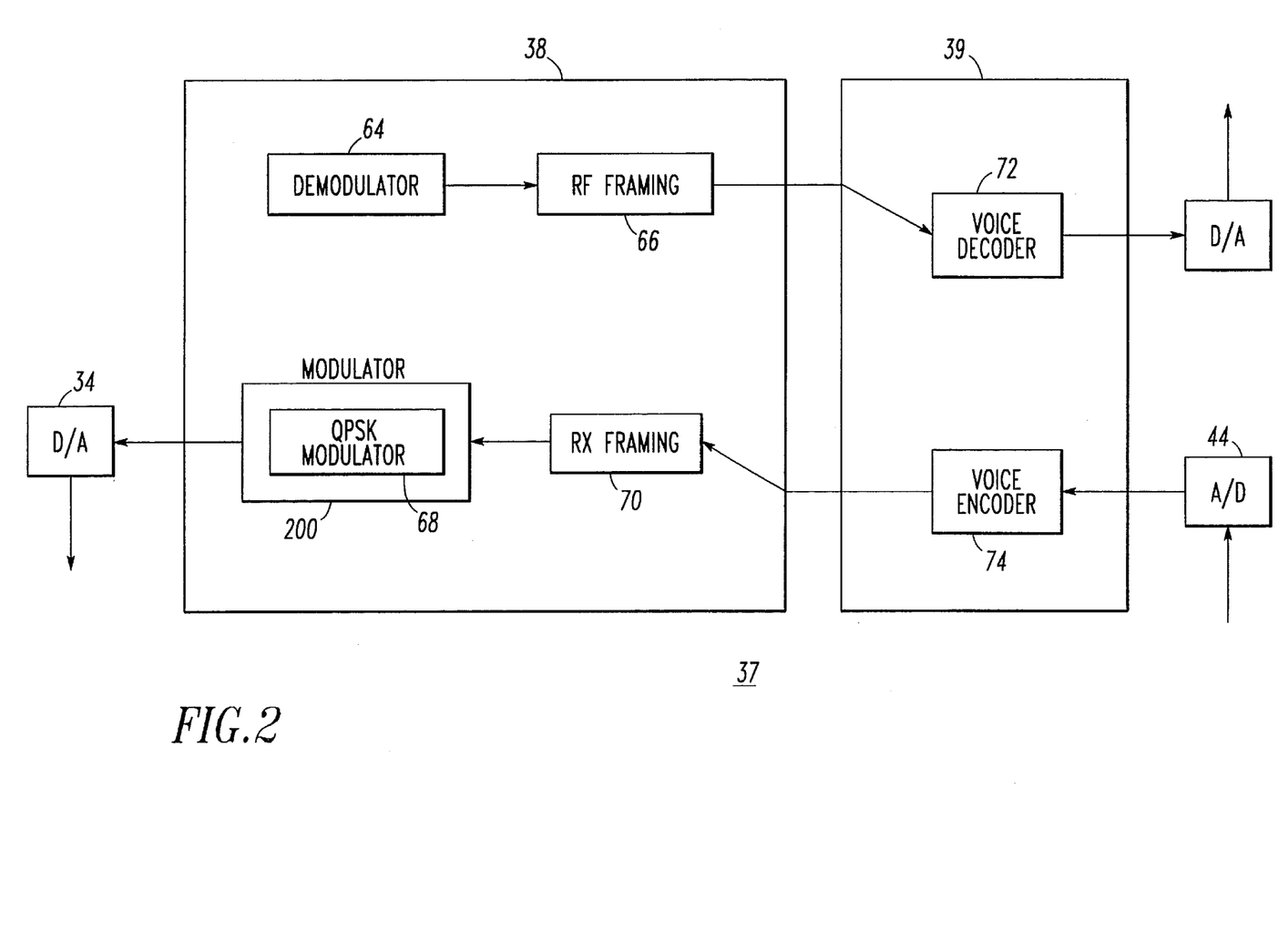
FIG. 2 is a schematic block diagram of the processor board of FIG. 1.

Referring to FIG. 2, the signal processor 37 is comprised of two individual digital signal processors (DSPs) 38 and 39. The DSPs 38 and 39 are preferably of the fixed point type that run at a clock speed of approximately 27 MHz. At one instruction per cycle, these DSPs provide 27 million instructions per second of processing throughput. Each such DSP is preferably of the type manufactured by Texas Instruments known as a TMS 320C51 type.

The DSP 38 includes a demodulator function 64, a receive framing function 66, a QPSK modulator 200, and a transmit framing function 70. The DSP 39 includes a decoding function 72 and an encoding function 74.

In the circuit switched voice mode, sometimes referred to as the Voice Single Channel per Carrier Mode (SCPC), the mobile terminal apparatus of the present invention operates in a full duplex mode, simultaneously transmitting and receiving voice mode frames. The timing of the transmit and receive satellite channels are asynchronous to one another.

One software function in the transmit chain is the QPSK modulator 68, a fully contained interrupt service routine associated with the modulator 200 which runs at the sample rate of the D/A converter.

For each symbol bit pair, 8192 real base band samples are read from a read-only memory, described below, to produce a filtered QPSK symbol modulated at an IF at the input of the digital to analog converter 34. Samples of each symbol are fed to the D/A hardware 34 of the MT. In addition, transmitter control is output by the up-converter 32 at the start and end of each burst to perform on/off control of the high powered amplifier 30 in the MT transmitter hardware.

Figure 3:
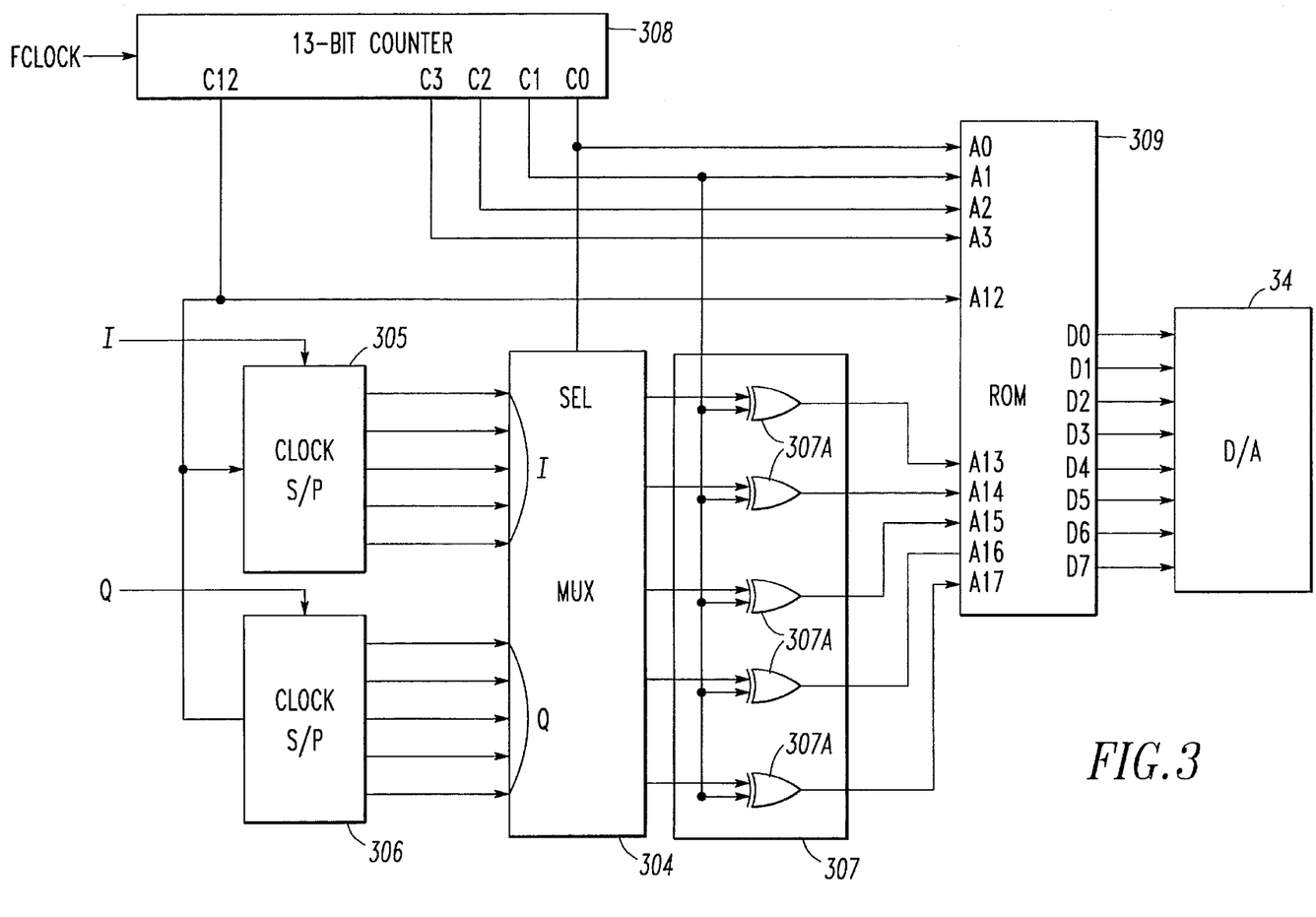
FIG. 3 is a schematic block diagram of the QPSK modulator of the present invention.

In accordance with the present invention, the QPSK modulator includes a counter, a pair of serial-to-parallel converters referred to herein as S/P or converters, a multiplexer, a sign inverting function, a ROM, a D/A, and a filter.

As herein embodied, the QPSK modulator 68 comprises a 13-bit counter 308, S/P 305 and 306, multiplexer 304, sign inverting function 307, ROM 309, D/A 34, as shown in FIG. 3.

The counter 308 outputs a plurality of bits which represent the binary value of a number as the counter counts from 0 until all of the bits are in a high state and correspond to a particular sample number. The output bits of the counter are used as the least significant address bits for a ROM, described later, and to control other elements of the invention. As herein embodied, the counter is a 13-bit counter which counts from 0 to $2^{13}-1=8191$. The counter 308 is clocked at $F_{sample}$ which represents the sample frequency. The number of bits in the counter is determined by dividing the desired $F_{sample}$ (i.e., sample rate) by the $F_{symbol}$ resulting in 8192 samples which can be addressed by a 13-bit word (e.g., 27.648 Mhz/3375 Hz=8192 samples). Thus, the least significant bit C0 pulses at sample rate $F_{sample}$ and the most significant bit C12 pulses at the symbol rate $F_{symbol}$.

Both of the converters 305 and 306 operate by inputting each bit serially and outputting a plurality of bits in parallel for each clock pulse. Converters 305 and 306 operate as a first in first out shift register in that bits are shifted in and stored in the register as they occur in time. As each new bit arrives, it is added to the storage area and the oldest bit value is discarded. The values in the storage area are output in parallel fashion, so that at each successive clock pulse, each converter 305 and 306 outputs a certain most recent number of bits input. As herein embodied, the converters 305 and 306 input bits serially and output 5 bits in parallel. Both of the converters are clocked by the most significant bit of a counter 308 at $F_{symbol}$ (3375 Hz).

The input to the converter 305 is I of the input symbol pair and the input to converter 306 is Q of the input symbol pair. In the present invention, the bit streams I and Q are derived from the bit stream signal to be modulated and transmitted. As herein embodied, I represents the even bit values of the bit stream to be transmitted and Q represents the odd bit values of the bit stream to be transmitted. The outputs of both of the converters 305 and 306 are fed into the multiplexer 304.

The multiplexer selects between one of two inputs for output. As herein embodied, the multiplexer 304 selects either the 5-bit output from the converter 305 or the 5-bit output from the converter 306. The selection depends on the least significant bit C0 output by the counter 308 which alternates state at a frequency of $F_{sample}$. The output of the multiplexer 304, consisting of five bits, is fed into a sign inverting function.

The sign inverting function inverts the bits input based on certain conditions. As herein embodied, a sign inverting function 307 inverts the input bits when the second least significant bit C1 output by the counter 308 is in a high state. More particularly, the sign inverting function 307 is embodied as five exclusive-or gates referred to as 307a. Each of the bits output by the multiplexer 304 is fed to a 2-input exclusive-or gate as one of the inputs. The second input is the bit C1 from the counter 308. The function of each of the exclusive-or gates is defined as follows:

| mux 4 output | C1 | output |
|---|---|---|
| 0 | 0 | 0 (same as mux 4 output) |
| 0 | 1 | 1 (inverted mux 4 output) |
| 1 | 0 | 1 (same as mux 4 output) |
| 1 | 1 | 0 (inverted mux 4 output) |

The output of the sign inverting function 307 is then used as the most significant part of an address to a particular storage location in a ROM 309.

The ROM stores samples of a digitized waveform which are accessed by the address consisting of the output from the counter 308 and the sign inverting function 307. As herein embodied, the ROM receives the least significant address bit A0 from the output C0 of the counter 301, address bit A1 from the output C1 of the counter, and so on, up to address bit A12 from the output C12 of the counter. Address bits A13–17 come from the sign inverting function 307. A13 corresponds to the most recently shifted-in I or Q and A17 corresponds to the least recently shifted-in I or Q. The ROM 302 outputs an 8-bit value which is fed to the digital-to-analog converter (D/A) 34. The D/A converter 34 converts the 8-bit digital input to an analog signal.

When digital pulses, like the one shown in FIG. 4 (a), are converted to analog form without modification, the edges of the rectangular pulses cause unnecessary frequency sidelobes that can cause interference in adjacent frequency channels. To minimize this problem, pulses are filtered to "round off" the edges. The resulting pulses take the form as shown in FIG. 4 (b) and 4 (c). FIG. 4 (b) shows a filtered "1" at 402 and FIG. 4 (c) shows a filtered "0" at 404. As can be seen from FIGS. 4 (b) and 4 (c), the filtered pulse is no longer confined to the pulse width (or symbol time). The filtered pulse consists of a main lobe 403 and 405 centered around the middle of the pulse and side-lobes 406 and 408 which extend out from the main lobes 403 and 405 in both directions. Due to this result, adjacent pulses will affect the shape of the resultant filtered bit stream which consists of the additive pulse shapes. For example, consider FIG. 4 (d) which shows the pulse of interest 402, a filtered pulse of "1", and two adjacent pulses 404, filtered pulses of "0". As can be seen, the side lobes of the adjacent pulses overlap into the main lobe of pulse shape of 402. In transmitting the pulses, the effects of the adjacent pulses must be considered. Thus, the complete waveform is the addition of the pulse of interest plus the adjacent pulses whose side-lobes extend into the pulse of interest. To minimize the effect of the adjacent pulses, the basic filtered shape of a pulse is made to minimize the distance over which the side-lobes extend. As herein embodied, a root-cosine Nyquist filter with a roll-off factor between 40% and 60% is used. The Nyquist filter provides that adjacent symbols will have zero amplitude at a center 410 of the main lobe 403 as at the output of an intended receiver with a matching root-cosine Nyquint filter shown in FIG. 4 (*d*). Thus at the sample point 412 of the main lobe, only the pulse of interest contributes to the amplitude. Any filter which has decaying side-lobes may be used.

Figures 4A, 4B:
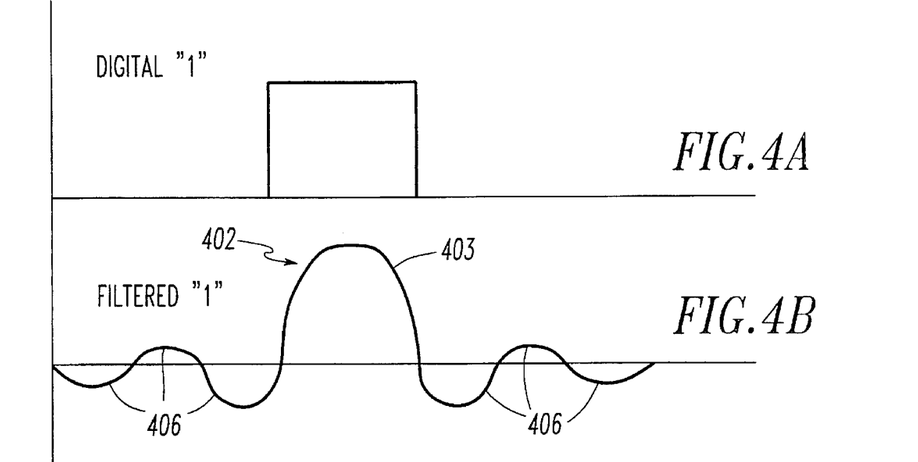
Figure 4C:
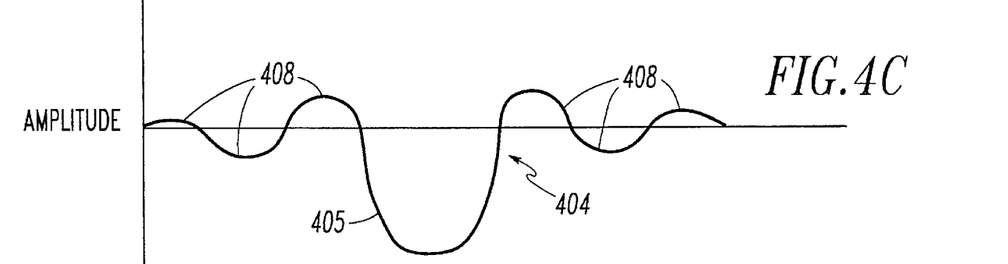
Figure 4D:
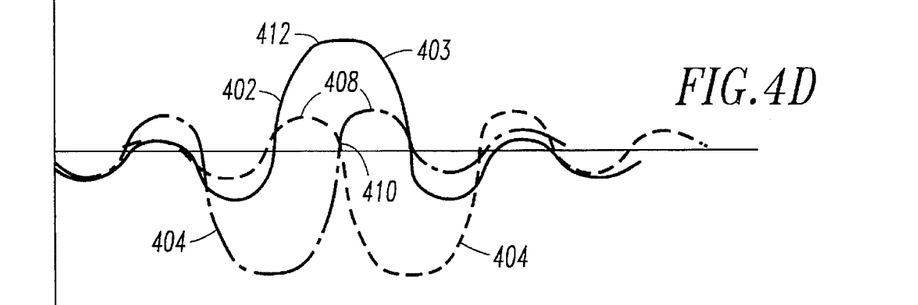
Figure 4E:
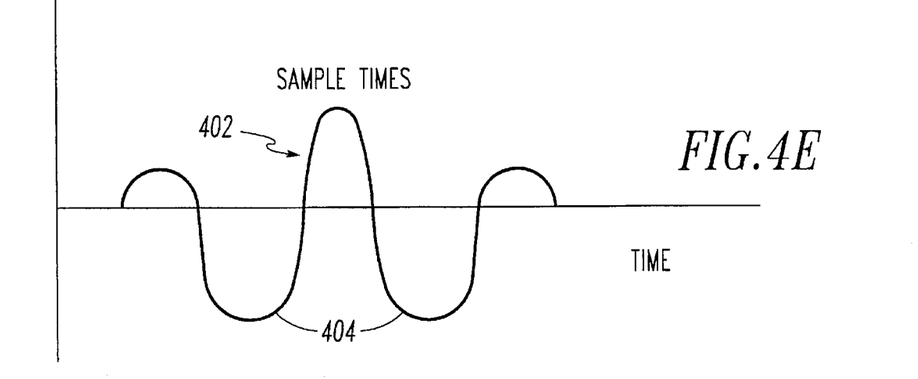

In the present invention, the symbol of interest plus the two adjacent symbols on either side are considered. However, any other number may be used depending on the desired accuracy of the apparatus. FIG. 4 (*e*) shows the resultant waveform when a filtered pulse 402 like the one shown in FIG. 4 (*b*) is affected by a single adjacent pulse, such as 404, on either side of the pulse of interest.

Accordingly, five bits at a time are output from the S/Ps which represent the pulse of interest and two pulses in front and two behind. More particularly, the output of the series to parallel converters contain the pulse of interest in the middle and two adjacent pulses on either side. FIG. 3 shows five bit lines from each of the single to parallel pulse converters 305 and 306 to a multiplexer 304.

Figure 5:
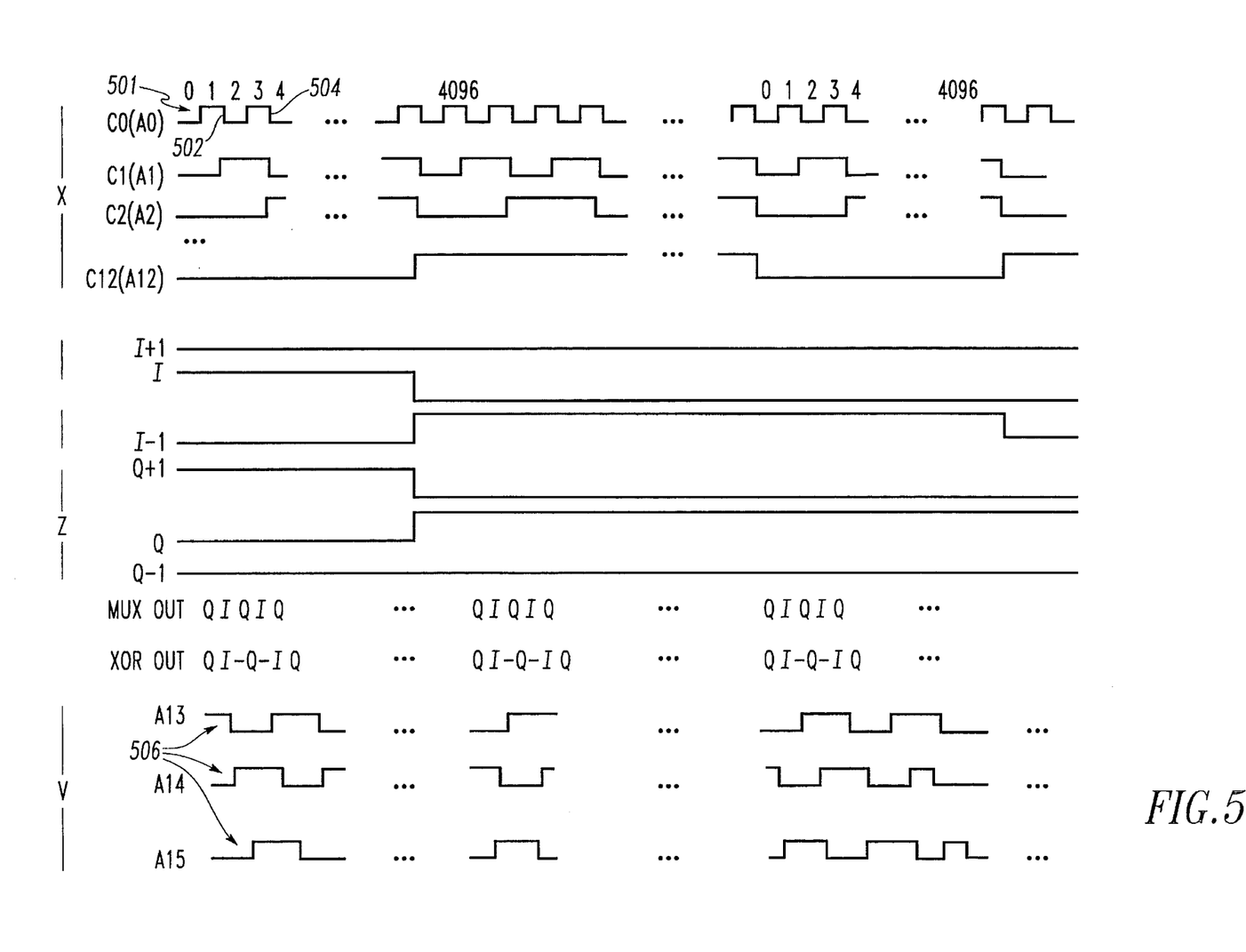
FIG. 5 is a timing diagram of the operation of the QPSK modulator of the present invention.

The multiplexer 304 and sign inverting function, in effect, multiplexes the I and Q signals into one output waveform by alternating between I and Q and inverting selected I and Q values as shown by example in FIG. 5. This can be explained as follows.

In the complex signal space of I and Q, I is represented on the real axis and Q is represented on the imaginary axis and assume that a 0 bit value is represented as −1. Thus, the signal space in the complex domain consists of four possibilities: I=1, Q=1; I=−1, Q=1; I=−1, Q=−1; I=1, Q=−1. Accordingly, a complex baseband waveform of the form y(n)=I(n)+jQ(n) is created to transmit the two signals simultaneously. But this waveform must be shifted to RF for transmission. To aid in this process, we shift the digital baseband to an IF as high as possible. In the present invention the IF is chosen to be 6.91 Mhz (=27.648 MHz/4).

The particular frequency of the IF was chosen for a specific reason. If the IF is ¼ of the sample rate $F_{sample}$ then certain simplifications have been recognized. Shifting the baseband waveform I(n)+jQ(n) from a frequency of zero to a frequency of ¼ the sample rate is accomplished mathematically by multiplying the waveform by $e^{j2\pi n/4}$ which is equivalent to $j^n$. The resultant multiplication gives:

| n, sample number | $j^n[I(n)+jQ(n)]$ |
| --- | --- |
| 0 | I(0) + j Q(0) |
| 1 | −Q(1) + j I(1) |
| 2 | −I(2) − j Q(2) |
| 3 | Q(3) − j I(3) |
| 4 | I(4) + j Q(4) |
| ... | ... |

If the complex waveform is added and converted directly to a complex analog waveform, there is the high probability that temperature differences in the analog components and differences in the analog amplifiers will give rise to phase and amplitude imbalances between the I and Q components. To eliminate this problem we select only the real component of the waveform as an input to an A/D. Selecting only the real part of the waveform results in a mirror negative frequency image. This frequency image is removed at the subsequent up conversion to RF.

From the pattern above, it can be seen that the real part of the waveform consists of alternating I and Q and inverting the sign for certain values of n.

The ROM 309 stores digitized values for waveforms of each of the possible five-bit sequence of bits passed through the Nyquist filter described above according to the sample value n. Thus an address in the ROM corresponds to a first part identifying a five-bit sequential input to the filter and a second part identifying which sample value of the waveform generated by the five-bit sequential input to the filter is to be output.

In the preferred embodiment the samples stored in the memory are determined according to the follow relation:

$$\text{word}\left(n + \sum_{m=0}^{M-1} 2^m * \text{Bit}_m\right) = \sum_{m=0}^{M-1} (2*\text{Bit}_m - 1) * h(n*T_{sample} - m*T_{symbol})$$

where word(n) is the $n^{th}$ word in memory, $\text{Bit}_m$ is the $m^{th}$ bit out of the shift register, h(n) is the impulse response, $T_{sample}$ is 27.684, and $T_{symbol}$ is 3375. The entire address space of the memory is $2^{M+log_2(N)}$, where N is the number of samples of the impulse response. In the preferred embodiment the address space is $2^{5+13}=2^{18}$.

The h(n) impulse response is determined from the inverse Fourier transform of H (f) where H (f) is the spectrum of the required channel matched filter which meets the preferred embodiment of a root-cosine Nyquist shape with roll-off factor between 40% and 60%. The impulse response h(n) of this type has a peak at the center and has rapidly decaying sidelobes. Accordingly, it is convenient to truncate the impulse response at 3, 5, or 7 symbols depending on the required resolution. In the preferred embodiment, the impulse response is truncated at 5 symbols.

The −I(n) and −Q(n) outputs may be obtained by a 2's complementing the output of the ROM. An equivalent, easier way, however, is to perform a 1's complement on the 5-bit sequential input to the ROM. A 1's complement can be accomplished by simply inverting the bit of interest. This results in a much easier and less costly logic implementation.

The operation of the invention will now be described with reference to FIGS. 3 and 5. FIG. 5 shows a timing diagram of various digital waveforms which correspond to signals shown in FIG. 3. For ease of discussion only, FIG. 5 shows I and Q values for three bits. In the preferred embodiment, as shown in FIG. 3, five bits are used. Digital waveform 501 corresponds to the decimal equivalent of the value of the counter 308 at a particular time which is also equal to the sample number. The first set of waveforms X correspond to the outputs C0, C1, C2, to C12 of the counter 308. Waveforms X also correspond to address bits A0, A1, A2, to A12 of the ROM 309. As shown in FIG. 5, a digital pulse C0 may take on a binary value of high or low. The rise of this pulse occurs on every other transition of the counter, since for the C0 bit, a transition to the opposite state occurs for every clock pulse. Thus for clock value of zero, C0 is low. For clock value of 1, C0 is high, and so on. C1 transitions on falling edge 502 of C0, so that C1 becomes high on the C0 edge transition from pulse 1 to 2 and C1 becomes low again at 504 on the C0 transition from 3 to 4. Over a period of time, C0 through C12 correspond to the binary representation of the value of the counter 308. C0 is the least significant bit and C12 is the most significant bit.

Waveforms Y show the bit transitions for 3-bit representative values of I at the outputs of the converter 305. Waveforms Z show 3-bit values at the output of the converter 306 for Q. The operation of the invention is described for 3-bit outputs from the converter 305 and 306 for simplicity; operation of a 5-bit output occurs in the same fashion. For the waveforms Y $I^{+1}$ represents the I value after the bit value of interest I, and $I^{-1}$ represents the bit value before the bit value of interest I. A similar notation and meaning is used for Q, $Q_{-1}$, and $Q_{+1}$ of the Z waveforms.

MUX OUT represents the value at the output of the multiplexer 304. A Q represents that the Q input from converter 306 is output by the multiplexer 304, and an I value represents that the I input from converter 305 is output by the multiplexer 304.

XOR OUT represents the output of the sign function 307. A "−" in front of I or Q represents that the I or Q bits output from the multiplexer 304 are bit inverted so that a high becomes a low and a low becomes a high. The output of the sign function 307 is also shown as a waveform in the waveforms V. Waveforms V show address bits A13–A15. As an example, for clock pulse 3, the multiplexer 304 selects the Q values (1, 0, 0) and the sign function 307 inverts the bits so that the address bits become Q-inverted or (0, 1, 1) as shown in the waveforms V.

The multiplexer 304 selects I or Q depending on the value of C0, as can be seen from MUX OUT showing whether I or Q is output from the multiplexer 304. The value of C1 determines whether the output of the multiplexer is inverted or not. In the XOR OUT (exclusive-or) the output of the exclusive-or is shown. At the digital train 506 are the most significant addresses to the ROM for a 3-bit embodiment, A13–A15. A 5-bit embodiment would also include address bits A16 and A17.

The digitized sample of the waveform is then read out from the memory and input to the digital-to-analog converter 34 (FIG. 1).

Thus, the modulator converts input pairs of I and Q signals into an IF waveform at ¼ of the sample rate using simple low-cost logic elements and a minimum of ROM storage.

It is important to note that the frequency of the IF is not necessarily required to be at ¼ the sample rate. The IF can be related to the output sample rate $F_{sample}$ by the expression which also accommodates both $f_s/4$ and $3f_s/4$:

$$f(IF) = f_{sample} * (2*n+1)/4, \text{ for } n=0,1,2\ldots$$

Notice that the IF can be higher than $F_{sample}$ using sub sampling techniques. In this case, the sign of the Q component must be inverted when n is odd to eliminate spectral inversion. Appropriate analog filtering is required for any IF to eliminate the spectral aliases; however, because of spectral shaping by the D/A aperture pulse, the signal at $F_{sample}/4$ is the easiest to extract. Since it is generally more useful to generate the modulated signal at the highest IF (to reduce further up-conversion requirements), a trade-off must be made to determine the appropriate IF.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A method of modulating binary data sequences, each having a plurality of symbols occurring at a symbol frequency, to an intermediate carrier frequency, and a ROM having a plurality of stored digital waveforms including a plurality of digitized samples and corresponding to one of a plurality of outputs of a filter in response to a plurality of combinations of symbol inputs having a predetermined span of symbols, said method comprising the steps of:

inputting, in parallel, first and second data sequences at the symbol frequency;

multiplexing an M number of symbols from each sequence at a sample frequency, the sample frequency being the intermediate carrier frequency divided by four to produce a multiplexed train of successive groups of the M number of symbols, in parallel, from first and second data sequences;

inverting every other pair of successive groups of the multiplexed train to form successive first portions of an address from successive inverted and non-inverted groups of the multiplexed train;

forming successive second portions of the address in accordance with a position of one of the groups in the inverted and non-inverted groups of the multiplexed train;

outputting from the ROM contents of a storage location corresponding a combination of the first and second portions of the address, so that for each parallel input from the first and second data sequences, a number of digital samples, corresponding to the sample frequency, are read out from the ROM at the intermediate carrier frequency; and converting the ROM outputs to an analog signal at the intermediate carrier frequency.

2. The method according to claim 1, wherein the M number of symbols multiplexed from first and second data sequences is equal to the predetermined span of symbols.

3. The method according to claim 1, wherein the predetermined span is 3 symbols.

4. The method according to claim 1, wherein the predetermined span is 5 symbols.

5. The method according to claim 1, wherein the ROM has only a real portion of the digital waveforms stored.

6. The method according to claim 1, wherein the intermediate carrier frequency is one-quarter of the sample frequency.

7. A modulator for modulating data sequences, each having a plurality of symbols occurring at a symbol frequency, to a carrier frequency, and a ROM having a plurality of stored digital waveforms including a plurality of digitized samples and corresponding to one of a plurality of outputs of a filter in response to a plurality of combinations of symbol inputs having a predetermined span of symbols, said digital modulator comprising:

serial to parallel input means for serially inputting, in parallel, first and second data sequences at the symbol frequency and outputting, in parallel, an M number of symbols from both trains;

a multiplexer for multiplexing the M number of symbols from each data sequence at a sample frequency, the sample frequency being an intermediate carrier frequency divided by four to produce a multiplexed train of successive groups of the M number of symbols, in parallel, from first and second data sequences;

an inverter for inverting every other pair of successive groups of the multiplexed train to form successive first portions of an address from successive inverted and non-inverted groups of the multiplexed train;

counting means for determining a position of one of the groups in the inverted and non-inverted groups of the multiplexed train corresponding to the first portion of the address;

address forming means forming successive second portions of the address from the position of the one of the groups in the inverted and non-inverted groups of the multiplexed train corresponding to the first portion of the address;

a ROM for outputting contents of a storage location corresponding to a combination of the first and second portions of the address, so that for each parallel input from the first and second data sequences, a number of digital samples, corresponding to the sample frequency, are read out from the ROM at the intermediate carrier frequency;

a digital-to-analog converter for converting the ROM outputs to an analog signal at the intermediate carrier frequency; and an up-converter for converting the analog signal to a carrier frequency.

8. The modulator according to claim 7, wherein the M number of symbols multiplexed from first and second data sequences is equal to the predetermined span of symbols.

9. The modulator according to claim 7, wherein the predetermined span is 3 symbols.

10. The modulator according to claim 7, wherein the predetermined span is 5 symbols.

11. The modulator according to claim 7, wherein the ROM has only a real portion of the digital waveforms stored.

12. The modulator according to claim 7, wherein the intermediate carrier frequency is one-quarter of the sample frequency.

13. A digital quadriphase-shift keying modulator, comprising:

a counter responsive to a clock signal for outputting successive pluralities of bits which represent successive values of the counter;

a first serial-to-parallel converter for receiving a plurality of first symbols in serial fashion and outputting a predetermined number of the plurality of first symbols in parallel fashion in response to a first bit of one of the successive pluralities of bits output by the counter;

a second serial-to-parallel converter for receiving a plurality of second symbols in serial fashion and outputting a predetermined number of the plurality of second symbols in parallel fashion in response to the first bit of the successive pluralities of bits output by the counter;

a multiplexer for selecting between the output of the first serial-to-parallel converter and the output of the second serial-to-parallel converter in response to a second bit of the successive pluralities of bits output by the counter;

sign changing means for changing a sign of the output selected by the selecting means in response to a third bit of the successive pluralities of bits output by the counter; and a memory for storing a plurality of digital samples of a waveform and outputting one of the plurality of digital samples in response to an address, wherein the address includes the output of the counter and the output of the multiplexer.

14. The apparatus of claim 13, further comprising:

a digital-to-analog converter for converting the output of the memory into a first analog signal of a predetermined frequency.

15. The apparatus of claim 13, wherein the plurality of bits output in parallel from each of the first and second serial-to-parallel converters is equal in number to a predetermined span of an impulse response.

16. The apparatus according to claim 15, wherein the predetermined span of the impulse span is 5.

17. The apparatus of claim 13, wherein the multiplexer selects the output from the second serial-to-parallel converter for an odd counter value and selects the output of the first serial-to-parallel converter for an even counter value, and wherein the sign means changes the sign of the output selected by the selecting means when a bit representing a $2^1$ power of the plurality of bits of the counter value is in a high state.

18. The apparatus of claim 13, wherein one of the plurality of digital samples output from the memory comprises a predetermined number of bits according to a desired resolution.

19. A method for communicating with a satellite comprising the steps of:

receiving first signals from the satellite in the form of first modulated signals;

demodulating the first modulated signals to produce first demodulated signals;

outputting the first demodulated signals;

generating first and second data sequences, each having a plurality of symbols occurring at a symbol frequency to be transmitted;

modulating the first and second data sequences for transmission to a carrier frequency, utilizing a ROM having a plurality of stored digital waveforms including a plurality of digitized samples and corresponding to one of a plurality of outputs of a filter in response to a plurality of combinations of symbol inputs having a predetermined span of symbols, said modulating comprising the substeps of:

inputting, in parallel, first and second data sequences at the symbol frequency;

multiplexing an M number of symbols from each train at a sample frequency, the sample frequency being an intermediate carrier frequency divided by four to produce a multiplexed train of successive groups of the M number of symbols, in parallel, from first and second data sequences;

inverting every other pair of successive groups of the multiplexed train to form successive first portions of an address from successive inverted and non-inverted groups of the multiplexed train;

forming successive second portions of the address in accordance with a position of one of the groups in the inverted and non-inverted groups of the multiplexed train;

outputting from the ROM contents of a storage location corresponding a combination of the first and second portions of the address, so that for each parallel input from the first and second data sequences, a number of digital samples, corresponding to the sample frequency, are read out from the ROM at the intermediate carrier frequency; and converting the ROM outputs to an analog signal at the intermediate carrier frequency;

up-converting the analog signal to the carrier frequency; and transmitting the up-converted signal to the satellite.

20. The method according to claim 19, wherein the M number of pulses multiplexed from first and second data sequences is equal to the predetermined span of symbols.

21. The method according to claim 19, wherein the predetermined span is 3 symbols.

22. The method according to claim 19, wherein the predetermined span is 5 symbols.

23. The method according to claim 19, wherein the ROM has only a real portion of the digital waveforms stored.

24. The method according to claim 19, wherein the intermediate carrier frequency is one-quarter of the sample frequency.

25. A mobile terminal unit for receiving from, and transmitting to, a satellite comprising;

receiving means for receiving signals from the satellite;

demodulating means for demodulating the received signals;

modulating means for modulating first and second data sequences, each data sequence having a plurality of symbols occurring at a symbol frequency, to an intermediate carrier frequency, said modulating means comprising:

a ROM having a plurality of stored digital waveforms including a plurality of digitized samples and corresponding to one of a plurality of outputs of a filter in response to a plurality of combinations of symbol inputs having a predetermined span of symbols;

serial to parallel input means for serially inputting, in parallel, first and second data sequences at the symbol frequency and outputting, in parallel, an M number of symbols from both trains;

a multiplexer for multiplexing the M number of symbols from each train at a sample frequency, the sample frequency being the intermediate carrier frequency divided by four to produce a multiplexed train of successive groups of the M number of symbols, in parallel, from first and second data sequences;

an inverter for inverting every other pair of successive groups of the multiplexed train to form successive first portions of an address from successive inverted and non-inverted groups of the multiplexed train;

counting means for determining a position of one of the groups in the inverted and non-inverted groups of the multiplexed train corresponding to the first portion of the address;

address forming means forming successive second portions of the address from the position of the one of the groups in the inverted and non-inverted groups of the multiplexed train corresponding to the first portion of the address;

a ROM for outputting contents of a storage location corresponding to a combination of the first and second portions of the address, so that for each parallel input from the first and second data sequences, a number of digital samples, corresponding to the sample frequency, are read out from the ROM at the intermediate carrier frequency; and a digital-to-analog converter for converting the ROM outputs to an analog signal at the intermediate carrier frequency; and an up-converter for converting the modulated first and second pulse trains to a carrier frequency.

26. The mobile terminal unit according to claim 25, wherein the M number of pulses multiplexed from first and second data sequences is equal to the predetermined span of symbols.

27. The mobile terminal unit according to claim 25, wherein the predetermined span is 3 symbols.

28. The mobile terminal unit according to claim 25, wherein the predetermined span is 5 symbols.

29. The mobile terminal unit according to claim 25, wherein the ROM has only a real portion of the digital waveforms stored.

30. The mobile terminal unit according to claim 25, wherein the intermediate carrier frequency is one-quarter of the sample frequency.

* * * * *